Patented Apr. 18, 1950

2,504,417

UNITED STATES PATENT OFFICE 2,504,417

LAMINATED SHEET STRUCTURES AND COMPOSITION

Charles H. Hofrichter, Jr., Snyder, N. Y., assignor to E. I. du Pont de Nemours & Company, Wilmington, Del., a corporation of Delaware No Drawing. Application May 11, 1945, Serial No. 593,335

4 Claims. (Cl. 154—46)

This invention relates to compositions having adhesive and moistureproofing properties, and to structures bonded therewith. More particularly, the invention relates to a non-aqueous, moisture-resistant, flexible, adhesive composition especially suited for laminating transparent, smooth, dense, non-fibrous sheets having a basis of water-sensitive or hydrophilic film-forming material, to similar or non-similar materials.

A principal object of this invention is to provide a non-aqueous adhesive composition of general utility which sets rapidly to form a strong, flexible, transparent, moistureproof bond.

Another object is to provide a non-aqueous, moistureproofing, adhesive composition useful for laminating film or sheets of regenerated cellulose and like water-sensitive film-forming material to similar materials or to non-similar materials.

A still further object is to provide a non-aqueous, moistureproofing, adhesive composition which sets rapidly to form a transparent, flexible, strong, durable and uniform bond between sheets of regenerated cellulose coated with conventional moistureproofing compositions, and which does not adversely affect the structure or effectiveness of the coating.

Still another object is to form a flexible and durable laminated structure comprised of smooth, dense, non-fibrous film or sheets of water-sensitive material adhered to similar or non-similar materials through the medium of an adhesive composition which provides at all times an unbroken, moistureproofing, strong cementing film between the lamina of said laminated structure.

These and other objects will more clearly appear from the following description.

I have found that a composition comprised essentially of an interpolymer of vinylidene chloride and vinyl chloride, a polymerized terpene resin and a polymerized isobutylene resin dissolved in a suitable volatile organic solvent or mixture of solvents, when applied as the cementing agent between film or sheets of regenerated cellulose or similar water-sensitive material to be laminated, particularly regenerated cellulose sheets coated with moistureproofing coating, dries rapidly, evenly, and without objectionable bubble formation to produce a strongly bonded, durable, wrinkle-free, laminated sheet structure which is substantially impermeable to moisture and remains so even after the structure is crumpled, creased or otherwise subjected to handling conditions normally encountered in the use of the laminated structure. Of particular importance is the fact that this adhesive adheres extremely well to moistureproofing coatings for regenerated cellulose film without causing any loosening or loss of effectiveness of the coating, a result long sought but seldom achieved heretofore.

Because the present invention is of particular advantage in the commercially important field of laminating smooth, dense, flexible, transparent, non-fibrous sheets or films of water-sensitive materials such as regenerated cellulose, it will be described hereinafter with specific reference to this latter type of sheet or film. It is to be understood, however, that the invention is not so limited but comprehends as well the lamination or cementing of substantially any materials or combination of materials, i. e., the adhesive composition of this invention is of general application.

As the vinylidene chloride-vinyl chloride interpolymer component of the composition of my invention, I prefer to employ the resin resulting from the interpolymerization of about 60% of vinylidene chloride with about 40% of vinyl chloride. This resin is manufactured by the Dow Chemical Company, and is sold commercially under the trade name Saran (B-130). Interpolymers with vinylidene chloride/vinyl chloride ratios of from 70/30 to 20/80 may be used with good results. For many uses it is possible to substitute for the vinylidene chloride-vinyl chloride interpolymer constituent those interpolymers of vinylidene chloride and acrylonitrile having ratios within the range 80/20 to 50/50. The vinylidene chloride-vinyl chloride interpolymer should constitute not more than 85% nor less than 20% by weight of the solids content of the composition.

The polymerized terpene resin sold commercially under the trade name of "Piccolyte S-40" (a thermoplastic, unsaponifiable, neutral polymerized β-pinene resin of the formula:

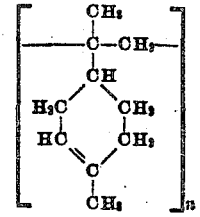

having a melting point of 40° C. (ball and ring); produced by Pennsylvania Industrial Chemical Company, Clairton, Pa.) is particularly suitable for the purposes of the present invention. This resin should comprise from 5% to 25% by weight, calculated on the total weight of the solids present in the composition.

The polymers of isobutylene, generally referred to as "polybutenes" are likewise well known and commercially available materials (Ind. Eng.

Chem. 32, 299–304, 731–736 (1940)), and either the high molecular weight or low molecular weight resin may be used in my composition. However, best results are obtained with those resins having a molecular weight of from 20,000 to 40,000. The composition should contain not more than 60% and not less than 10% by weight of polybutene resin, calculated on a solvent-free basis.

In preparing the compositions, any volatile organic solvent dissolving the vinylidene chloride-vinyl chloride interpolymer, the polymerized terpene resin, and the polybutene resin ingredients, may be used. I have found a 50–50 mixture of toluene and methyl isobutyl ketone to be particularly effective. The concentration of solids in the solution may be varied over a wide range, and the optimum value in each instance will of course be dictated, for the most part, by the nature of the materials to be bonded, and by the method of application and manner of drying (solvent removal).

Any of the methods well known to the art for the application of adhesives may be employed, e. g., brushing, spraying, dipping, etc. Similarly, lamination may be effected by any of the procedures and expedients known for the purpose in laminated film and analogous manufactures.

As pointed out hereinabove, the adhesive composition of this invention is particularly effective in the lamination of regenerated cellulose film coated with moistureproofing compositions. The effectiveness of my composition in this regard is not limited to films coated with any one moistureproofing coating composition or class of compositions but obtains rather with any of the moistureproofing coating compositions now known to the art. Representative moistureproofing coatings and coating processes for regenerated cellulose film are described in U. S. Patent 2,147,180 (Ubben), U. S. Patents 1,826,-697–8 (Charch and Craigue) and U. S. Patent 1,737,187 (Charch and Prindle).

To more fully set forth and illustrate the practice of this invention and the nature of the adhesive composition thereof, the following specific examples are given. Parts and percentages are by weight unless otherwise indicated.

Example I

Two transparent regenerated cellulose sheets each 0.001 of an inch thick and coated on both sides with a 0.00005 of an inch thick moistureproofing, anchored, transparent coating of the following composition:

|  | Per cent |
|---|---|
| Nitrocellulose (11.4% N) | 34.0 |
| Partially polymerized isobutyl ether of dimethylol urea | 25.2 |
| Beckacite 1110 (maleate modified ester gum) | 10.0 |
| Maleic acid | 4.8 |
| Dibutyl phthalate | 22.0 |
| Paraffin wax | 4.0 |

12% solids in ethyl acetate 46%, toluene 32%, isobutanol 22% were coated on one side with an adhesive of the following composition:

|  | Parts |
|---|---|
| Saran (B–130) | 70 |
| Piccolyte S–40 | 6 |
| Polybutene resin (M. W. 24,000) | 24 |

35% solids in a solvent consisting of equal parts of toluene and methyl isobutyl ketone.

The solvent was removed by evaporation from the freshly coated face of one sheet and this face was firmly laminated to the coated face of the other sheet under pressure at 75° C.

The resulting laminated sheet was flexible, uniformly transparent, and free of bubbles and wrinkles. It exhibited an initial permeability value to moisture of 50, and after crumpling had a permeability value of 50. The tear value was about 35 g.

Tear values herein set forth indicate additional improvement contributed by the strength of the adhesive layer and are determined in accordance with the procedure set forth in U. S. Patent 2,268,611 (Mitchell). Moisture permeability values are defined, and are determined herein in the manner described in U. S. Patent 2,147,180 (Ubben).

Example II

Regenerated cellulose sheets provided with moistureproofing coatings as described in the previous example were each coated on one side with a composition consisting of:

|  | Parts |
|---|---|
| Vinylidene chloride-acrylonitrile 60/40 interpolymer | 60 |
| Piccolyte S–40 | 15 |
| Polybutene resin (M. W. 24,000) | 25 |

35% solids in a solvent consisting of equal parts of toluene and methyl isobutyl ketone.

The solvent was removed by evaporation from the freshly coated face of one sheet and this face was firmly laminated to the coated face of the other sheet under pressure at 75° C.

The resulting composite sheet exhibited similar moistureproof properties as the product of Example I.

Example III

Two coated regenerated cellulose sheets identical with those of Example I were coated each on one side with a composition consisting of:

|  | Parts |
|---|---|
| Saran (B–130) | 50 |
| Piccolyte S–40 | 10 |
| Polybutene resin (M. W. 24,000) | 40 |

35% solids in a solvent consisting of equal parts of toluene and methyl isobutyl ketone.

The sheets were bonded together as in the previous examples.

The resulting structure was slightly less moistureproof than was the product of Example I, but exhibited a higher tear value. In all other respects it was substantially the same as the product of Example I.

It will be apparent that the compositions of this invention will be useful in general for those purposes requiring a strong, flexible and moisture-resistant seal. The composition of this invention produces a strength of seal and a degree of moistureproofness not heretofore available in compositions of its class. It is extremely useful for laminating regenerated cellulose film, either coated or uncoated, to the same or different materials, and its use avoids the phenomena of deformation and consequent wrinkling of the film which normally attends the use of aqueous adhesives. When used to laminate two sheets of transparent, plain or coated regenerated cellulose film, the resulting product has a continuous intermediate film or layer of highly moistureproof material which remains unbroken and hence effective even when the composite sheet is crumpled or creased, and in addition the moistureproof film or layer is physically protected by the outer laminae of regenerated cellulose. The advantages and wide field of utility for such a product in the packaging and kindred arts are obvious. These adhesive compositions are particularly useful for producing laminated structures having a high degree of flexibility, durability, transparency, moistureproofness as well as protection against water, oil, grease and other influences, which properties particularly suit such structures for use as wrapping tissue, containers, interliners, etc.

It is apparent that many widely different embodiments of this invention may be made without departing from the spirit and scope thereof, and it is intended therefore that the invention be not restricted otherwise than by the limitations of the appended claims.

I claim:

1. A composition of matter having adhesive and moistureproofing properties and comprising from 5 to 25% by weight, based on the weight of the solids, of a thermoplastic, unsaponifiable, neutral polymerized β-pinene resin of the formula:

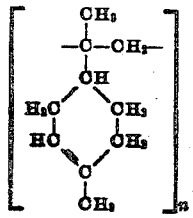

having a melting point of 40° C., from 10% to 60% by weight of a polybutene resin having a molecular weight of from 20,000 to 40,000 and from 20% to 85% by weight of an interpolymer of vinylidene chloride and vinyl chloride having a ratio of vinylidene chloride to vinyl chloride within the range of from 70:30 to 20:80, all dissolved in a volatile organic solvent.

2. The composition of claim 1 wherein the ratio of vinylidene chloride to vinyl chloride in the interpolymer is 60:40.

3. As a new article of manufacture a moisture-resistant laminated sheet structure comprising sheets of regenerated cellulose bonded face to face by a composition comprising essentially from 5% to 25% by weight of a thermoplastic, unsaponifiable, neutral polymerized β-pinene resin of the formula:

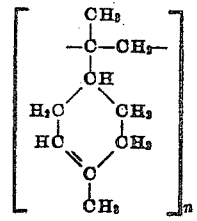

having a melting point of 40° C., from 10% to 60% by weight of a polybutene resin having a molecular weight of from 20,000 to 40,000 and from 20% to 85% of an interpolymer of vinylidene chloride and vinyl chloride having a ratio of vinylidene chloride to vinyl chloride within the range of 70:30 to 20:80.

4. The article of claim 3 wherein the ratio of vinylidene chloride to vinyl chloride in the interpolymer is 60:40.

CHARLES H. HOFRICHTER, Jr.

REFERENCES CITED

The following references are of record in the file of this patent:

UNITED STATES PATENTS

| Number | Name | Date |
|---|---|---|
| 2,116,184 | Beale | May 3, 1938 |
| 2,320,716 | Corkery | June 1, 1943 |
| 2,334,236 | Arnold | Nov. 16, 1943 |
| 2,349,508 | Mack | May 23, 1944 |
| 2,354,855 | Emanuel | Aug. 1, 1944 |
| 2,364,875 | Schieman | Dec. 12, 1944 |